Dec. 13, 1966 A. W. BROWN 3,291,868
PRODUCTION OF POLARIZING ELEMENTS
Original Filed July 30, 1958 4 Sheets-Sheet 1

INVENTOR.
Alfred Winsor Brown
BY
ATTORNEYS

INVENTOR.
Alfred Winsor Brown

Dec. 13, 1966   A. W. BROWN   3,291,868
PRODUCTION OF POLARIZING ELEMENTS
Original Filed July 30, 1958   4 Sheets-Sheet 3

INVENTOR.
Alfred Winsor Brown
BY
ATTORNEYS

Dec. 13, 1966   A. W. BROWN   3,291,868
PRODUCTION OF POLARIZING ELEMENTS
Original Filed July 30, 1958   4 Sheets-Sheet 4

INVENTOR.
Alfred Winsor Brown
BY
ATTORNEYS

United States Patent Office 3,291,868
Patented Dec. 13, 1966

3,291,868
PRODUCTION OF POLARIZING ELEMENTS
Alfred Winsor Brown, Woonsocket, R.I., assignor to Owens-Corning Fiberglas Corporation, a corporation of Delaware
Continuation of application Ser. No. 751,933, July 30, 1958. This application July 20, 1964, Ser. No. 383,893
5 Claims. (Cl. 264—2)

This application is a continuation of 751,933, filed on July 30, 1958, now abandoned, which is a continuation-in-part of 627,980, filed on December 13, 1956, now U.S. Patent 2,981,480, which is in turn a continuation-in-part of 596,397, filed on July 9, 1956, now abandoned.

This invention relates to the production of polarizing elements, and, more particularly, to the production of material which is polarizing by virtue of the incorporation therein of glass in the form of flakes or flakelets.

Various naturally occurring and synthesized materials are polarizing, or orienting, to light waves. A wave of ordinary or unpolarized light is considered as involving vibrations in random directions lying in a plane perpendicular to the direction of propagation of the wave. Polarized light may be considered as a fraction of ordinary light, being the part of the normal vibration which lies, also, in a plane through the axis of the wave. It has been demonstrated that polarized light, when produced by filtering the random vibrations which do not lie in the second identified plane, can constitute not more than 50 percent of the wave energy of the original or unpolarized light.

The large scale production of polarizing elements was first made possible by the discovery that minute crystals of a polarizing material can be incorporated in a plastic sheet material, suitably oriented, and then formed into polarizers of desired shapes.

A more recent development (see U.S. Patent 2,402,176 and Science Illustrated, volume 4, No. 6, June 1949, pages 24–27) is based upon the discovery that polarizing elements can be produced from a multiplicity of layers of very thin plastic material suitably adhered into the polarizing element. This recent development provides, from many standpoints, a substantial improvement in the production of polarizing elements. There are however, difficulties from the processing standpoint as will be immediately apparent from a consideration of the requirements such material must meet. For example, the individual sheets of a plastic material must have a maximum thickness of about 0.004", preferably a thickness of 0.0015" or less, and from 15 to 30 such sheets must be formed into the polarizing element. The sheets must be separated from one another by a distance greater than the wave length of the light to be polarized, but not more than about 0.010", and a substance (usually air) having a refractive index differing from that of the sheets by at least 0.2 must be disposed between adjacent sheets. The necessary spacing can be achieved by means of spot adhesive or of suitable spacing means at the edges holding the entire assembly in transverse tension, air or gas being included and sealed between the adjacent sheets.

Methods for producing glass in the form of flakelets are known, and such material, refractive index 1.55, is presently available in substantial quantities. The production of papers therefrom has been suggested, but the product "possessed no tear strength" (see "Properties of Paper Made From Glass Flakes," Callinan and Lucas, Report of N.R.L. Progress, May 1955). Impregnation of the paper with various binders was suggested to provide a tear strength that would make feasible the use of the product in contemplated applications.

It has been found that a polarizing element somewhat similar to that disclosed in U.S. Patent 2,402,176 can be produced by dusting glass flakelets onto a transparent plastic sheet. Either a transparent or a translucent (light-diffusing) sheet can also be placed above the flakelets. If desired, the edges of the two sheets could be sealed together with any suitable adhesive in order to form a unitary sandwich structure which would constitute a usable polarizing element. As has been stated above, the glass flakelets have an index of refraction of about 1.55. Air, which separates the flakelets in the structure described, has a refractive index of 1.00. As a consequence, such structure comprises a mass of glass flakes supported in spaced arrangement in the mass, and a substance (air) having a refractive index differing from that of the glass by at least 0.2 disposed between adjacent flakelets. A similar polarizing element is produced by positioning a sheet of paper made from glass flakelets on a transparent sheet in a like manner. Such polarizing elements, while not specifically disclosed in the prior art, are difficult to produce, and are not claimed herein. Neither a prior art paper produced from glass flakelets and impregnated with a binder nor a sheet of transparent material reinforced with glass flakelets constitutes a polarizing element because the requisite difference in refractive index between glass and binder does not exist.

The present invention is based upon the discovery of polarizing elements which can be produced with facility from thin plates or flakelets of glass. The glass flakelets are bound in place in the polarizing elements by a suitable binder.

One object of the instant invention is, therefore, the production of polarizing elements comprising glass flakes or flakelets.

Another object of the invention is the provision of improved polarizing elements.

A further object of the invention is to provide an improved method for making polarizing elements.

Other objects and advantages will be apparent from the description which follows, reference being made to the accompanying drawings, in which—

Figure 1:
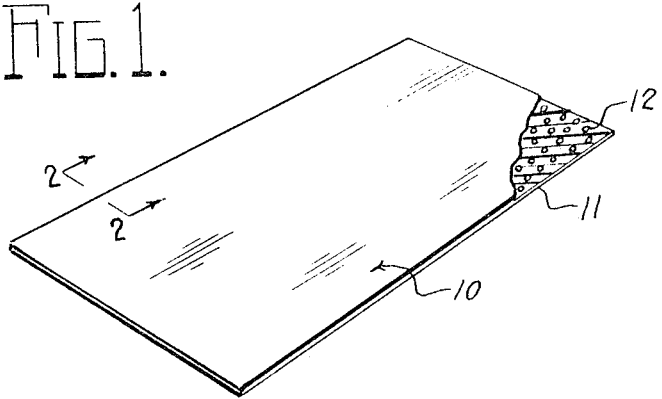
FIG. 1 is a perspective view showing a polarizing sheet produced by the method of the invention.

A new polarizing element is provided according to the invention. Such polarizing element comprises a mass of glass flakelets supported in spaced arrangement in the mass by a suitable binder, and a substance having a refractive index differing from that of the glass by at least 0.2 disposed between adjacent flakelets.

As will subsequently be discussed in more detail, the substance having a refractive index differing from that of the glass by at least 0.2, which substance is disposed between adjacent flakelets, can be air or another gas, can be a coating applied to the glass flakelets, or can be a portion of the binder material itself.

The binder can be any suitable organic or inorganic, natural or synthetic adhesive composition. It is preferred that the binder be at least virtually transparent in order to avoid absorption, by the polarizing element, of any appreciable portion of transmitted light. Polyvinyl acetate, polyvinyl pyrrolidone, polyvinyl methyl methacrylate, methyl methacrylate and other acrylic binders, polystyrene, and various polyesters can be mentioned as specific suitable organic binders that are at least virtually transparent. Silicic acid, magnesium silicate, and silicates of other metals forming oxides, hydroxides and carbonates having a pH not greater than 10.5 can be mentioned as specific inorganic binders. Neither the strength characteristics, within reasonable limits, nor the chemical identity of the binder employed in a polarizing element according to the invention is of particular importance. The sole function of the binder is to support the flakes or platelets of glass relative to one another. If greater strength than is provided by the binder is required, the polarizing element can be positioned on a supporting sheet, for example of glass or of a transparent or translucent sheet material, or between two such sheets. Such sheet or sheets can provide the required strength, while the element according to the invention is polarizing to light transmitted therethrough. If desired, at least one such sheet can be diffusing to light.

One method for producing a light polarizing element according to the invention comprises forming a uniform suspension of a limited amount of a suitable binder, a solvent or dispersing agent therefor, and glass flakes or platelets, for example in a paper beater, casting the resulting suspension on a suitable foraminous base, for example a screen, allowing excess binder and solvent or dispersing medium to drain through the foraminous support, and hardening the binder. Only a limited amount of the binder should be employed to produce a polarizing element according to this method when presently available glass flakelets are employed. As has been indicated above, such flakelets have a refractive index of about 1.55, which is substantially identical with the refractive indices of most binders. Therefore, if a large amount of the binder is employed, so that the space between adjacent flakelets is completely filled with binder, the resulting paper has a substantially constant refractive index throughout its thickness, and does not act as a polarizing element.

In a specific instance, a polarizing element has been produced in the manner described in the preceding paragraph, using water as a dispersing medium, from glass flakelets and 3 percent of polyvinyl acetate as a binder, based upon the total weight of glass and binder. In general, from about 1 percent to about 5 percent of a binder, based upon the total weight of glass and binder, can be employed to produce such a polarizing element. In view of the foregoing discussion it will be appreciated that the ability of such papers to polarize light is attributable to the presence of a gas, usually air, between adjacent flakelets, or between flakelets and binder. The refractive index of the gas is about 1.00, and that of the binder and glass about 1.55. Using such glass flakelets, the production of a paper with more than about 5 percent of a binder, based on the weight of binder and glass, results in a paper having relatively few gas-filled voids, and, as a consequence, relatively few discontinuities in refractive index. Such a paper is comparative ineffective as a polarizing element, and is completely non-polarizing if all such gas-filled voids are eliminated. A polarizing element which has been produced using less than about 1 percent of a binder, on the indicated basis, is comparatively unsatisfactory because of its relative weakness.

When it is desired to produce a polarizing element according to the invention in the form of a paper, and using more than about 5 percent, on the indicated basis, of a binder, an additional step, beyond those discussed above, is required. For example, a coating of high refractive index can be applied to the glass flakelets; a controlled amount of air or other gas can be incorporated into the slurry; a vaporizable material such as a volatile solvent can be incorporated into the slurry and volatilized after formation of the paper to force a separation between the binder and the flakes; or the binder can be treated to effect gassing of a portion thereof in order to force a separation between the binder and the flakes. A polarizing element according to the invention can also be produced, for example in the form of a paper, from glass flakelets having a refractive index differing from that of the binder by at least 0.2, preferably by at least 0.5.

In general, when glass flakelets produced from a glass having a refractive index differing from that of the binder are employed to produce a polarizing element, it is preferred that the refractive index of the glass be higher than that of the binder. In such instance, a light wave passing through the polarizing element is subjected to the requisite change in refractive index in passing from glass to binder or air, in passing from binder to glass or air, and in passing from air to binder or glass. A polarizing element produced from glass having a high refractive index, for example approximately 2, need not contain pockets of air or other gas, as the binder itself can constitute a substance disposed between adjacent flakelets, and having the requisite different refractive index; the same is true of polarizing elements produced from flakelets coated with a material of high refractive index. Where a polarizing element is produced either using glass flakes having a high refractive index or relatively low index flakes coated with a material of high refractive index, it has been found that optimum results are achieved by using a mixture of the coated flakes or the high refractive index flakes and uncoated flakes having a refractive index of about 1.5. Preferably, the polarizing sheet which is produced should contain from about 10 to about 15 interfaces of high refractive index, whether coated or continuous, and most desirably about 12, in a thickness. In this way, panels having an optimum combination of polarizing and transmission characteristics are obtained. A panel having a practical ratio of glass flakes to binder, and only about the indicated number of interfaces in a given thickness, is extremely thin and, therefore, relatively unsatisfactory for most purposes. Such a thin panel can, however, be laminated with one or more additional panels, such additional panels preferably being reinforced with glass flakes having a refractive index of about 1.5, and without appreciable disturbance at binder-flake interfaces, to produce a composite polarizing panel according to the invention. If desired, a mixture of high index flakes and lower index flakes of about 1.5 can be mixed in such proportions that, in a panel of a desired dimension, on the average, the indicated number of high index flakes will be found in a given panel thickness.

A coating of high refractive index can be applied to glass flakelets in any of several ways. For example, titania, zirconia, or like materials, can be deposited on the glass surface, as in a drum tumbling device containing glass flakes and such a material. The surfaces of the glass flakes can also be treated with titanium tetrachloride, and then with ammonium hydroxide, and pyrolized, for example at about 600° F. $TiO_2$ is formed on the glass surfaces as a result of such treatments. The glass surfaces can also be heated and exposed to a gaseous atmosphere of tetraisopropyl titanate, or tetraisopropyl titanate can be dissolved in a suitable solvent, applied to the glass surfaces, and a titanium silicate coating formed by heating.

One method for producing glass flakelets involves flowing a stream of molten glass through an annular orifice in the form of a tube, gripping and advancing the tube with attenuating rolls disposed below the orifice, and introducing air or other gas into the interior of the tube under slight pressure to prevent collapse of the walls thereof, or to cause slight expansion thereof. A coating of high refractive index can be applied to the interior of the tube by using isopropyl titanate as at least one component of a gas which prevents collapse of the walls of the tube in such process. The coating would then be only on the inner surfaces of the tube, and on only one side of the glass flakelets formed by cracking of the tube. However, if desired, the tube could also be suitably enclosed and an atmosphere of tetraisopropyl titanate maintained on the exterior thereof. Glass flakelets formed by cracking such a tube would then have the coating on both surfaces thereof.

It will be appreciated from the foregoing discussion that, in many instances, a layer of air or other gas, disposed between at least one side of a flake and a binder supporting that flake relative to the remainder of the element, is advantageous in polarizing elements according to the invention. The provision of such a layer of air or other gas can be facilitated by employing glass flakelets that are not planar, but have a certain curvature. Glass flakelets having a curvature can be produced in generally the manner described above by eliminating the pressure of air or other gas inside the tube so that the walls thereof are collapsed by the pull of the attenuating rolls.

Two part flakes, hereinafter for convenience referred to as "double glass flakelets" can also be produced as described in U.S. Patent 2,457,785. Such flakes result from collapse of the glass tube between attenuating rolls, and cracking of the resulting film. The double glass flakelets are composed of two bodily separate flakelets which are tightly held together, probably by Van der Waal's forces.

It will be appreciated that the thickness of the glass flakelets can be a significant factor in determining the characteristics of polarizing elements according to the invention. Satisfactory results have been achieved using commercially available flakelets having an average or nominal thickness of about 0.00004 to 0.00038", and probably varying several fold from such average. The average thickness of such flakelets can be increased or decreased, however, by decreasing or increasing the rate at which the attenuating rolls discussed above are driven. The thickness of the flakes or platelets of glass can, therefore, be varied within substantial limits either above or below the presently commercially available 0.00004 to 0.00038" thickness. Presently preferred flakes have a nominal thickness of 0.00008". It has been noted that extremely thin flakes of glass, e.g., 0.00004 to 0.00008", per se show an interference pattern.

It has been found that air clings to the surfaces of glass flakes or platelets to an extent such that, if the flakelets are merely mixed with a suitable binder and the binder cured, air bubbles will cause the resulting cured mass to be opaque, or, at best, only translucent, even though both the binder and the glass are transparent. Various techniques have been tried to eliminate such air from binder-glass flakelet mixtures, prior to curing of the binder, because the entrapped air interferes with reinforcement of the binder by the flakes, as well as with light transmission. For example, glass flakelets have been mixed with monomeric styrene, in the absence of any polymerization catalyst for the styrene, and subjected to heat under vacuum in order to eliminate the entrapped air.

A polarizing element in the form of a hardened sheet material reinforced with glass flakelets can also be produced by any of several other methods. For example, glass flakes can be mixed with a suitable binder resin, placed under vacuum to remove entrapped air, and the mixture placed between heated platens to form a cured sheet of desired form. The cured sheet can then be converted into a polarizing element by causing a disturbance at some of the interfaces between the glass and the binder. Such a disturbance can be caused by subjecting the sheet to mechanical shock, to high frequency electrical waves or to other high frequency vibration, or to thermal shock. In addition, such elements can be produced by curing the sheet at a temperature above the maximum curing temperature for the binder to cause rapid curing or overcuring thereof, and resulting disturbance at some of the interfaces. At least a part and preferably only a part of the flakes, before mixture with the binder, can also be treated with a material which provides a non-adhesive surface, for example a stearylsilane. Preferably, such a material is applied to some of the flakes from a solvent solution, and the flakes are only partially dried, so that some of the solvent remains and is vaporized during curing or during a post-curing heat treatment. Curing a sheet containing such flakelets produces a structure which is polarizing because of interfacial disturbances caused by lack of adhesion between the binder and the coating, at least when cure is at a comparatively high temperature for the particular binder, or when the sheet, after curing, is reheated as subsequently discussed. Also, at least a part of the flake can be moistened, mixed with a binder, the mixture formed into the desired shape, and cured in a dielectric oven so that the moisture is vaporized, causing the desired disturbance at the interface between flake and binder. Moistening of the flake can be accomplished by use of liquid water, or in a high humidity atmosphere. Any suitable solvent can be used instead of water to moisten the flakes, or can be mixed with the binder in order to produce a similar gassing effect and resulting disturbance during curing. A gassing agent, such as monomeric styrene, an acrylic monomer, or the like, can also be mixed with a suitable binder. Usually, a suitable gassing agent is capable of reaction with the binder, e.g., a polyester; in such case, an excess of the monomer is used, and the excess acts as the gassing agent. Flakes can then be mixed with the binder composition, formed, and cured. The presence of the gassing agent also causes bubbling during curing, or during a heating step which follows curing, and disturbance at the binder-flake interface. Splitting a panel composed of glass flakes embedded in a binder causes a mechanical shock at the binder-glass interface, thus making the panel polarizing, and also produces rough diffusing surfaces.

Figure 2:
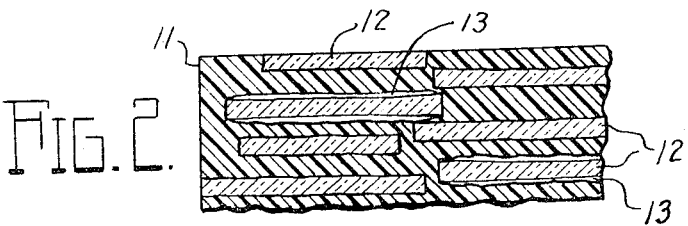
FIG. 2 is a vertical sectional view along the line 2—2 of FIG. 1 showing details of the structure of the polarizing sheet.

As a specific example, a polarizing element according to the invention can be produced from 100 parts of a commercially available polyester resin, 10 parts of monomeric styrene, 1 part of benzoyl peroxide, and 50 parts of a flake glass. The various ingredients are mixed until the flakes are wet by the resin; the mixture is then subjected to vacuum to remove most of the entrapped air, either during mixing or subsequent thereto; and sheets or other shapes are then formed by curing the mixture at about 200° F. between heated platens. The platens may be of such configuration to produce a flat sheet, a corrugated sheet, or any other desired shape. A flake glass paper of the type previously described can, if desired, be attached to the surface of the cured sheet, or positioned between the heated platen and the curing resin so that it will be adhered to the final cured sheet. The described composition of binder, styrene, benzoyl peroxide, and flake glass can also be extruded in any desired shape, for example as rods, tubes, sheets or other, and subsequently cured while suitably contained under pressure. The resulting cured product can then be converted to a polarizing element by means of mechanical or thermal shock, or by means of high frequency electrical waves or mechanical vibration. Such a sheet is indicated generally at 10 in FIG. 1, and is composed of a suitable binder 11 with glass flakelets 12 embedded therein. As can be seen in FIG. 2, the resin 11 constitutes a continuous phase with the flakelets embedded therein and bonded thereto, and disposed with their major surfaces generally parallel to the major surfaces of the sheet 10. By virtue of the thermal shock to which the sheet was subjected, as described, pockets 13 of air or other gas are disposed between the major surfaces of the flakelets 12 and the body of the resinous binder 11. In this structure, the pockets 13 constitute the substance of refractive index different from that of the flakes.

An improved method of forming a polarizing element involves the utilization of multiple heating steps to cure the binder and at the same time to disrupt the interfaces between the flakes and the binder. The initial heating of the resin and the flake mix at least partially cures or sets the resin and the subsequent heating step or steps disturb the resin to glass interfaces to provide polarization.

A polarizing element according to the invention has also been produced from a mixture of one part of a commercially available coupling agent, 80 parts of double glass flakes and 20 parts of a commercially available polyester resin. The mixture was cured, in the form of a sheet, under pressure in a suitable mold, for ten minutes at 150° F. and then for twenty minutes at 300° F. The resulting sheet was found to be polarizing. It will be noted that a high temperature cure was employed, as well as double glass flakelets. It is believed that both of these factors contributed to polarization, the former for reasons previously discussed. The double flakes are separated from one another at least at some points, by a thin film of air, so the necessary refractive index difference can be achieved therefrom. Another example of a polarizing element according to the invention is produced by curing in the described manner a mixture wherein single flakes are substituted for the double glass flakes.

The following compositions have been mixed and cured to form a polarizing panel:

*Example 1*

| | Parts by weight |
|---|---|
| Methyl methacrylate monomer | 70 |
| Polyester | 70 |
| Benzoyl peroxide catalyst | 2.8 |
| Untreated, single platelets of glass | 70 |

*Example 2*

| | Parts by weight |
|---|---|
| Styrene monomer | 70 |
| Polyester (P–433, Rohm & Haas) | 70 |
| Benzoyl peroxide catalyst | 2.8 |
| Untreated, single platelets of glass | 70 |

Both of the two above formulations were thoroughly mixed in a Hobart, high-speed mixer wherein the flakes were substantially broken with the resut that a final flake or platelet size ranging from $1/16''$ to $1/8''$ appears to be produced. The platelet size should be from about 30 to about 120 mesh when producing either reinforced sheet or polarizing panels. Larger flakes make it difficult to obtain a uniform dispersion of flake and binder. After thorough mixing of the ingredients, the composition was subjected to a vacuum (minus 30″ of mercury) for five minutes to remove entrapped air. The resulting de-aerated composition was then formed into sheets by placing the composition between sheets of cellophane and spreading the composition between these cellophane sheets with a roller to form a sheet about 0.06″ thick. An appropriate jig was used to provide the proper sheet thickness. Overfeeding of properly spaced rolls may also be used to advance a sheet of the proper thickness therebetween. The resulting sheets were heated in an oven at about 250° F. to cure the resin.

Another method of forming a sheet comprises introducing the composition between the platens of a press. A total pressure of 1000 pounds which amounted to 10 pounds per square inch on the 100 square inch sheet was applied. The platens were heated with 10 pounds per square inch steam (approximately 240° F.) to cure the composition of Example 2. A molding time of 5 minutes was used at about 212° F. to cure the composition of Example 1. The sheets so formed and cured had some sparkle but were relatively clear and transparent.

Subsequent heat treatments are used to make the above sheets polarizing. The subsequent heat treatments are carried out at about 275° F. in the case of the styrene monomer and at about 250° F. in the case of the acrylic composition. Much higher temperatures can be used, if desired. Temperatures up to 340° F. or more may be used. The time at which the cured sheets are exposed to further heat varies inversely with the temperature used. Polarizing panels have been formed using heating times of up to about 5 minutes or more.

The polarizing effect may be produced due to the vaporization of the non-copolymerized or residual styrene or acrylic monomer which forms transition layers or pockets between some of the flakes and the resin. These transition layers have a low refractive index which provides the necessary difference in index of refraction as compared to the glass so that polarization results. In addition to the formation of transition layers, it is believed that the differential expansion between the resin and the flake which takes place in the subsequent heating steps may cause physical separation of some of the flakes from the resin during heating. The resin expansion is about 50 times as great as the glass expansion. During cooling the resin tends to contract much faster than the glass with which it is associated and, therefore, separation again will be achieved between the resin and some of the flakes.

It has been observed that a sheet which is heated to higher and higher temperatures will have greater and greater changes in appearance. An added sparkle is achieved in the panel which might be described as a silvery appearance. The panel no longer remains clear and transparent but becomes more milky or pearlescent. If desirable, rapid cooling can be used to increase the pearlescent effect. The above phenomena may be provided by a combination of the vaporization of the residual monomer and the differential expansivities of the materials, cured resin and glass.

It has been found that sheets having the silvery appearance are polarizing. Postheating can be used to make panels polarizing or the polarizing effect can be increased by postheating. Multiple postheating steps may be used, if it is desired.

The postheating temperature depends upon the particular resin or resins being used and upon the type of monomer and its percentage included in the previous cure cycle. Generally, shorter postheating periods may be used if the original cure temperatures are high. If low original cure temperatures are used, the postheating temperatures should be increased to achieve the desired effect. If low cure temperatures are used, then the postheating must be carried out for long periods in order to get the polarizing effect. Long postheating is sometimes undesirable since the resin may tend to discolor from the application of the heat. When using polyester resins, the desired curing conditions generally vary from 10 to 50 pounds of steam (line gauge pressure) which provides temperatures of from about 240° F. to 298° F. With such cure temperatures the postheating temperatures will vary from about 250° F. to 400° F. in an air oven. If desirable, the flake and resin panels may be postheated between metal sheets or the like in order to conduct and transmit the heat of the oven to the panel more effectively and to provide the desired surface configuration. After postheating, the panels are advantageously cooled between flat plates of wood, metal, or the like, to compress any surface bubbles and to flatten the panels or post form them to desired shapes. A camber can be given a sheet in this manner to counteract the effect of sag when the finished panels are installed.

*Example 3*

125 parts of polyester resin
70 parts of double thickness flake
14 parts of styrene monomer
1.4 parts of benzoyl peroxide as a catalyst This mix was rolled out into a sheet between two sheets of cellophane and then molded using 10 pound steam for about 15 minutes. A flat panel was molded with the distribution of the flake within the resin being good. The panel was then afterheated at about 390° F. for 5 minutes to cause the sheet to be polarizing. As the panel was removed from the postheating oven, it was quenched with water and then cooled between sheet metal plates to maintain the panel in a perfectly flat condition.

Polyester resin with flakes or platelets of glass may be cured at temperatures of about 235° F. and then postheated at from 300° F. to about 400° F. and cooled in air or water to enhance the polarizing properties of the panels. If desirable, one or both surfaces of the panels may be embossed to provide a random appearance. Some of the flakes will be tilted to provide further polarization of light hitting at an angle normal to the surface of the panel. In addition, the textured surface improves the appearance and acts as a diffusing surface for light passing through the panel. Various surfaces including pebble-grained and deep, random embossing may be used. It is generally desirable to have the top surface of the panel smooth for ease of cleaning. A pebble-grain surface upsets the linear or planar relationship of flakes and also provides some polarization at 90° where normally no polarization would be present. The pebble-grain surface provides a uniform appearance and minimizes non-uniformity of internal flake distribution.

A specific example of a binder composition which includes a gassing agent is produced by mixing 100 parts of the polyester resin, 35 parts of monomeric styrene, and 3 parts of benzoyl peroxide. A polarizing element according to the invention can be produced directly from this composition merely by mixing glass flakes therewith, subjecting the resulting mixture to vacuum to remove entrapped air, and then curing an element in the desired shape. The excess monomeric styrene acts as a gassing agent during cure, and causes the desired interfacial disturbance. The presence of an excess of catalyst enhances the disturbance at the interfaces. The gassing effect can also be increased by curing at a relatively high temperature, e.g., about 250° F. and then postheating to enhance the polarization still further.

It has been found with the work using polyester resins that at least a minimum cure must be given to provide sufficient hardness in the resin before the postheating theatment so that an interfacial disturbance can be caused by the heating and cooling. The postheating step makes the polyester resin soft again and, if desired, the molding or the embossing may take place during this postheating step, or a polarizing element of any desired shape can be formed. Preferred polarizing effects are achieved when there are from 8 to 16, and most desirably about 12, disturbed interfaces, or gas pockets, on the average, in the thickness of a polarizing sheet according to the invention. This means that from 4 to 8, and most desirably, about 6, flakes, on the average, should have gas pockets disposed between their surfaces and the resinous binder in any given thickness. In a specific instance, a panel produced from 40 percent of glass flakes and 60 percent of a suitable binder resin, and having a thickness of 0.035", included, on the average, 100 flakes in the thickness. In this case, from 4 to 8 percent of the flakes, and most desirably about 6 percent, should have gas pockets between both of their surfaces and the binder. If a thicker sheet is produced, a smaller percentage of interfacial disturbance is desired, while, if a thinner sheet is produced, a larger percentage of interfacial disturbance should be produced. Similarly, if thinner or thicker glass flakes are used, a lesser, or greater, respectively, percentage of interfacial disturbance would be required for optimum results. A greater percentage of interfacial disturbance can be achieved by increasing the percentage of styrene or other monomer in the resinous binder, or by postcuring to a higher temperature, for example. It will be appreciated that the glass flakes which are adhered directly to the binder, or where there is no interfacial disturbance, serve to reinforce the binder, while the remaining flakes, which have interfacial disturbances, give the polarizing effect. The same considerations are controlling when a mechanism other than "popping" is used to achive polarizing, e.g., a high- or low-refractive index coating on glass flakes. The coated flakes or other mechanism provide about the indicated number of interfacial changes, on the average, through any thickness.

It will be appreciated that the techniques of using a binder composition containing a gassing agent, or a solvent, can be employed in the production of polarizing elements in the form of glass flake papers.

Figure 4:
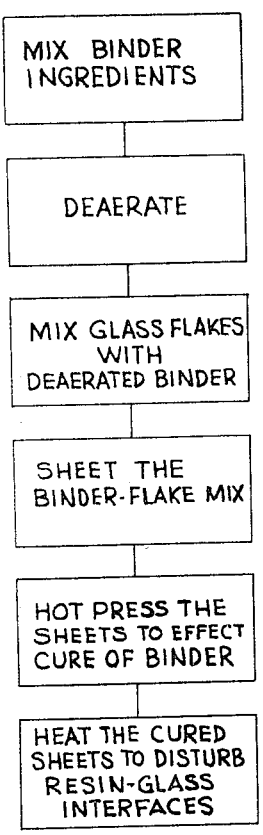
FIG. 4 is a flow diagram representing the various steps in a method for producing polarizing panels, and shows, specifically, the steps in the best presently known mode for practicing the method of the invention.

Referring now to FIG. 4, the best presently known mode for practicing the invention comprises the steps of mixing binder ingredients, deaerating the mixture, mixing glass flakes with the deaerated binder mixture, sheeting the binder-flake mix, hot pressing the sheets to effect cure of the binder, and heating the cured sheets to disturb the binder-glass interfaces. These several steps are described in more detail in the following example.

*Example 4*

Figure 5:
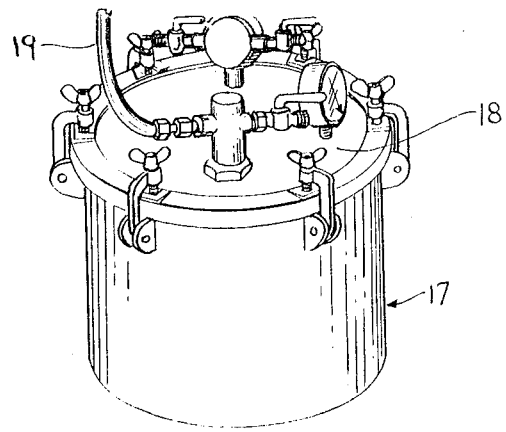
FIG. 5 is a perspective view showing apparatus in which a deaeration step in the method of FIG. 4 can be carried out.

A binder of the polymerizable, unsaturated polyester type is prepared by heating a charge consisting of 1.05 mols of ethylene glycol, 0.8 mol of maleic anhydride, 0.2 mol of phthalic anhydride and an amount of hydroquinone equal to 0.04 percent of the charge to a temperature of 230° C. in two hours, and holding the charge at a temperature between 230° C. and 235° for five additional hours. An 80 part portion of the resulting reaction product, which is an unsaturated, polymerizable polyester, is mixed with 20 parts of methyl methacrylate monomer, and a 75 part portion of the resulting mixture is blended with 50 parts of styrene monomer, 0.3 part of vinyldimethoxyethoxysilane, and 1.8 parts of benzoyl peroxide, using a suitably driven propeller for agitation until a uniform composition is achieved. The resulting composition is then placed in a vacuum vessel 17 (FIG. 5), and a gasketed cover 18 s tightly clamped onto the vessel 17. Vacuum is then applied to the closed vessel by connecting a line 19 to a vacuum pump, and progressively reducing the pressure inside the vessel 17 to 27" of mercury vacuum. A vacuum of 5" of mercury is maintained for two minutes, followed by a vacuum of 10" of mercury for two minutes, 15" of mercury for an additional two minutes, 20" of mercury for a further two minutes, and finally a vacuum of 27" of mercury for fifteen minutes.

Figure 6:
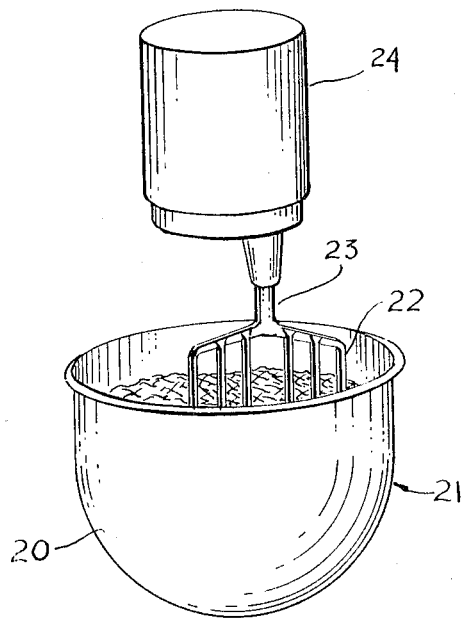
FIG. 6 is a view in perspective showing apparatus in which a mixing step of the method of FIG. 4 can be carried out.

The resulting deaerated binder composition is maintained at room temperature for two hours, and a 50 part portion thereof is then charged to a container 20 of a mixer indicated generally at 21 (FIG. 6). The mixer 21 is provided with a paddle-type stirrer 22 which is mounted on a shaft 23 of a motor 24. A charge of 50 parts of glass flakes having a thickness ranging from about 0.00010 to 0.00014" and an average major surface area of about 0.06 square inch is then prepared and added slowly and stepwise to the binder charge in the container 20. After all of the glass flakes have been added, the walls of the container 20 are scraped, and the mixer is run for about an additional half minute. The consistency of the resulting mixture is such that the mixture can be described as "spreadable," it being one which deforms readily under pressure.

Figure 7:
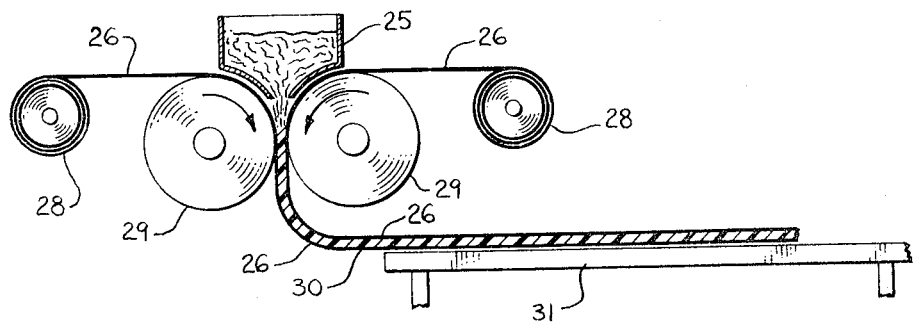
FIG. 7 is a schematic view in elevation representing apparatus in which a sheeting step of the method of FIG. 4 can be carried out.

Referring now to FIG. 7, the mixture is then charged to a hopper 25 in which it rests on sheets 26 of cellophane passed from supply rolls 28 and over suitably driven co-operating calender rolls 29. The nip between the calender rolls 29 is set from 0.032" to 0.035" to produce an ultimate cured sheet having a thickness of about 0.030" to about 0.035". The binder-glass flake mixture is formed into a sheet 30 between the calender rolls 29, with cellophane cover sheets 26 above and below the sheet 30. Glass flakes within the sheet 30 are oriented with their major surfaces generally parallel to the major surfaces of the sheet. The sheet 30 and the cellophane sheets 26 are drawn onto a skid 31, and cut to a desired size. Various sheet materials other than cellophane can also be used as cover sheets. For example, polyester films and parchment have been used satisfactorily.

Figure 8:
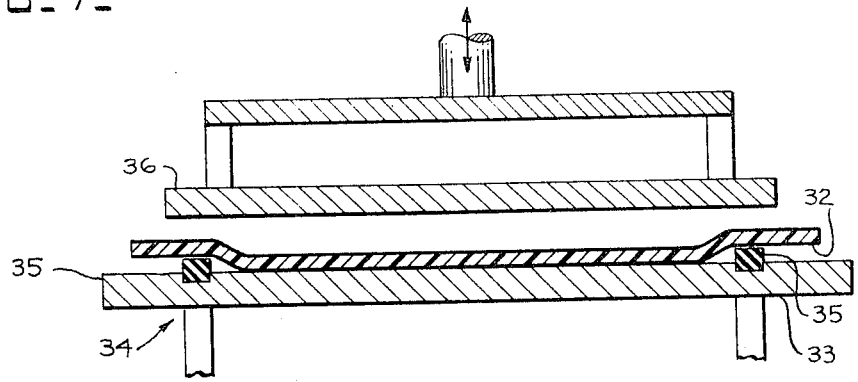
FIG. 8 is a partially schematic view in vertical section of a molding press in which a hot pressing step of the method of FIG. 4 can be carried out.

A suitably trimmed portion of the sheet 30 (designated 32 in FIG. 8) is then placed on a lower steam heated platen 33 of a molding press designated generally at 34. A resilient rubber gasket 35 is embedded in the platen 33, and extends entirely around the periphery of a panel produced in the press 34 from the sheet 32. As will be seen from FIG. 8, however, the sheet 32 extends beyond the gasket 35. A steam or electrically heated platen 36 is suitably mounted for limited vertical movement into and out of cooperating relationship with the platen 33. The platen 36 can be actuated by a suitable hydraulic cylinder (not illustrated). The sheet 32 is cured in the press 34, with the platens 33 and 36 maintained at 210° F., and using a pressure of 200 pounds per square inch on the sheet, and a curing cycle of 3 to 5 minutes. The rubber gasket 35 is compressed when the platen 36 is lowered into cooperative relationship with the platen 33, and encloses the edges of the sheet 32 during cure thereof, so that the entire sheet is confined, and subjected to pressure. After curing is complete, the cellophane or other covers 26 are stripped from the sheet 32.

Figure 9:
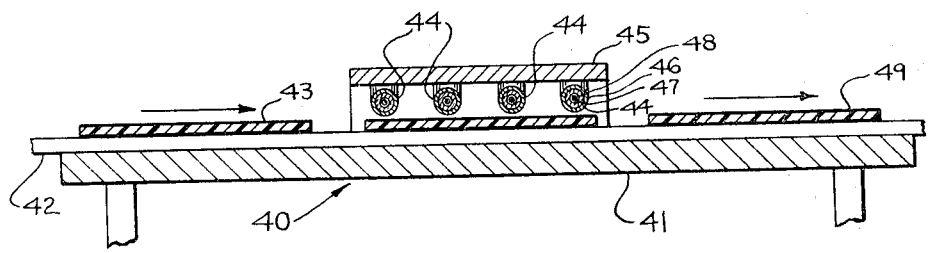
FIG. 9 is a partially schematic view in vertical elevation showing apparatus in which a final post curing heat treatment step of the method of FIG. 4 can be carried out.

A cured sheet produced as described in the preceding paragraph, which is nearly transparent, is subjected to a further heat treatment in "popping" apparatus indicated generally at 40 in FIG. 9. The apparatus 40 comprises a table portion 41 over which a conveyor belt 42 is suitably driven at variable speeds. Cured sheets, designated 43, are carried by the conveyor belt 42 under resistance heating elements 44 which are supported by a reflector 45, and suitably connected to any source for a variable voltage, for example the output side of a variable rheostat. Each of the heaters 44 in the structure shown in FIG. 9 comprises an outer tube 46 with a resistance coil 47 embedded therein, and packed in powdered magnesium oxide. The sheets 43 are heated as they are moved under the heating elements 44 by the conveyor 42, and to a temperature which depends upon the power input to the resistance coils 47 and the rate at which the sheets 43 are advanced. Excellent results are achieved, when the distance between the first and the last of the heating elements 44 is about four feet and when the elements 44 are positioned about three inches above the sheets 43 by supplying power to the coils 44 to maintain the temperature just above the sheets at about 325° F., and by advancing the sheets 43 at a rate of about three feet per minute. The heating portion of the apparatus 40 is substantially enclosed by the reflector 45 and side plates 48, one of which is shown in FIG. 9. The effect of incidental air currents on heating of the sheets 43 is minimized in this way. An oven at a temperature from about 250° F. to about 300° F. can also be used satisfactorily in place of the apparatus of FIG. 9.

The consequence of heat treating sheets 43 in the apparatus of FIG. 9 can be observed visually. As is indicated above, the sheets 43 are nearly transparent. The heat treatment, after curing, converts the sheets 43 to translucent polarizing sheets 49.

If desired, parts of the sheets 43 can be protected against the heating action in the apparatus 40, so that such parts remain transparent and non-polarizing, while the parts which are not so protected are made translucent and polarizing. For example, an insulating shield in a desired shape can be placed in a desired location on each of the sheets 43 for this purpose. Where infra-red or the like heating is employed, instead of resistance heating as in the apparatus of FIG. 9, a photographic negative having portions which are opaque or reflective to infra-red or the like rays can be used for this purpose.

The final sheet 49 is both a polarizing panel and a diffusing panel. The diffusing characteristics of the panel 49 can be enhanced by using as one of the cover sheets 26, a parchment which has a patterned surface, or by mixing a small amount of an opaque pigment with the binder. Mixing from about 0.1 percent to about 1.0 percent, preferably about 0.3 percent of $TiO_2$ with the binder has been found to give good results.

A polarizing panel according to the invention, for example the panel 49 shown in FIG. 9, is highly translucent to incident light waves traveling normal to the major surfaces thereof, or at an angle up to about 40° to the normal, and substantially opaque to light waves traveling at angles of from 75° to 90° to the major surfaces. Opacity increases as a direct function of angle of incidence for angles from 40° to 75° to the major surfaces. This feature of panels according to the invention is important in the ceiling lighting field where a light remote from an observer, and being transmitted through a panel according to the invention, is not distracting, but a light immediately above the observer lights his surroundings. This feature could also be used to advantage in the installation of solar heating panels. Panels according to the invention could be used for this purpose, and positioned at such an angle that they are highly transparent to heat and light energy transmitted by the sun during the winter season, when the position of the sun in the sky is relatively low, but are opaque to such energy when the sun is in a relatively high position in the sky during the summer season. A panel produced according to the invention, and used in this manner, enables derivation of the benefit of solar heating in the winter, while minimizing solar heating in the summer.

Although a description of thermosetting resins has been used in the examples, thermoplastic resins may be used also in producing polarizing members. Resins such as the acrylic resins, styrene, methylstyrene, methylmethacrylate, methylethacrylate, ethylmethacrylate, ethylethacrylate, and others may be used in a manner similar to that described for the thermosetting resins in the examples, but making suitable changes in processing techniques to compensate for the thermoplastic characteristics thereof.

Polarizing elements can advantageously be used as window panes, headlight lenses, light bulbs, venetian blind slats, light fixtures, in industrial glazing, as street lighting diffusers, as lamp shades, as inserts for glass block, or as coatings on the inside or outside of light bulbs. Particularly in the case of flash bulbs which are to be used in colored photography, polarizing coatings are advantageous because color definitions in film efficieny are improved by polarizing light. A particularly advantageous way for producing a light bulb, either a flash bulb or one used for ordinary lighting purposes, is by forming a slurry of a binder and flake glass, and including a gassing agent, such as a solvent, an excess of styrene, an acrylic resin, or the like, and applying this slurry to at least one surface of the bulb, either interior or exterior. The slurry can be applied by brushing, flowing, spraying, dipping or the like, and then can be hardened by heating. During hardening of the coating, the interfaces between binder and glass are disturbed by the presence of the gassing agent, with the result that the bulb is polarizing. If desired, suitable dyes or pigments can be incorporated in a binder mix for use in producing polarizing elements according to the invention, e.g., as described in Example 4, above. The dyes or pigments can be used to produce a panel of a desired color, or to complement the characteristic yellow color of the resin and the characteristic light yellow-green color of the glass to produce a water clear panel.

Polarizing elements according to the invention can also be assembled to produce articles which are useful both as polarizers and as diffusers, for various types of camera work. For example, a structure indicated generally at 50 in FIGS. 10 and 11 comprises a reflector 51, a light source 52, and a combined polarizer and diffuser indicated generally at 53. The combined polarizer and diffuser 53 is composed of a plurality of relatively narrow slats 54, which are polarizing panels produced according to the invention. The slats 54 are fastened together, for example by means of a polymerizable polyester composition of the same general type as the binder contained in the slats, and so disposed that each slat forms what may be described as a "three-dimensional V" with at least one other slat. The angle between adjacent slats should be from 50° to 60°. As a consequence of the opacity of the slats 54 to light waves incident at an angle greater than about 40° to the normal, and of the angles between adjacent slats 54, light waves from the source are refluxed to a substantial extent before they ultimately strike one of the slats 54 at an incident angle appropriate for transmission, so that both polarizing and diffusing are accomplished. It has been demonstrated that interposing the structure 53 between a light source and a subject to be photographed eliminates a substantial amount of glare and produces sharper photographs.

Figure 10:
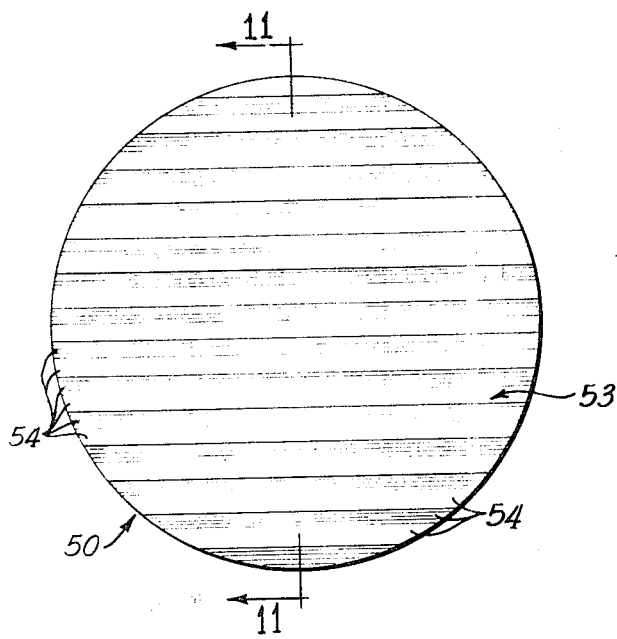
FIG. 10 is a view in front elevation showing a light polarizer and diffuser fabricated from polarizing elements produced according to the invention.
Figure 11:
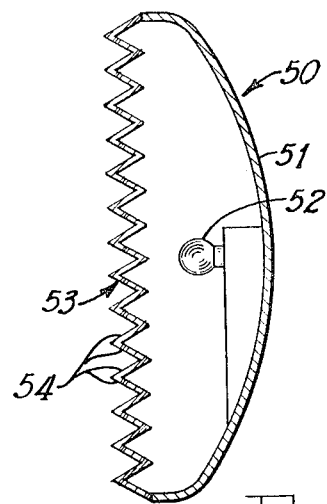
FIG. 11 is a sectional view along the line 11–11 of FIG. 10.
Figure 12:
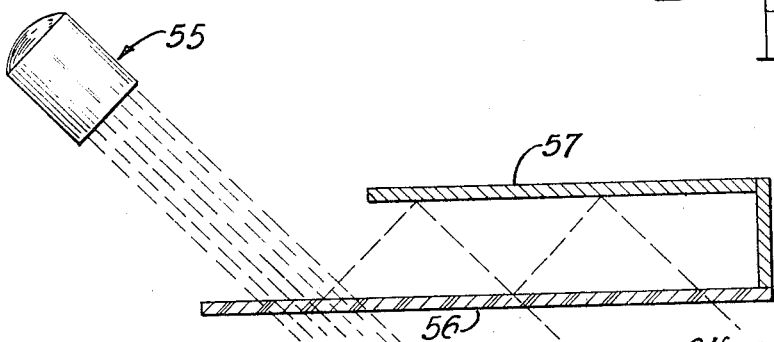
FIG. 12 is a partially schematic view of a modified polarizer and diffuser which includes a panel produced according to the invention.

A combined polarizing and diffusing device incorporating a panel produced according to the invention, and somewhat similar to that shown in FIGS. 10 and 11, but significantly modified, is shown in FIG. 12. This structure markedly changes the characteristics of light, so that a human eye has been able to read much finer print illuminated with the light than the eye could read under unpolarized light of the same intensity. The combined polarizer and diffuser of FIG. 12 comprises a suitable reflectorized light source indicated generally at 55, and constructed in any suitable manner to throw a beam of generally parallel light waves in the direction indicated in dotted lines onto an upper surface of a polarizing panel 56 produced according to the invention. The panel 56 is disposed relative to the light source 55 so that the angle between the incident light waves and surface of the panel is from about 55° to about 60°. Incident light on the panel 56 at such an angle is partially transmitted and partially reflected. One light wave is indicated by a dotted line as being partly reflected from the panel 56 against a reflector 57, and back onto the panel 56. A part of this reflected wave is transmitted through the panel 56, while a further part thereof is again reflected. It will be appreciated that other waves are similarly partly reflected and partly transmitted, so that a refluxing action is achieved by the apparatus of FIG. 12, which action avoids excessive losses of light which are characteristic of many polarizing assemblies, but also provides polarized light which, in a sense, has been diffused.

The paper-making procedures described above have also been employed to produce papers 0.012" thick and 0.006" thick from a mixture of 50 parts of glass flakelets and 50 parts of bleached kraft, and to produce papers 0.015" thick and 0.005" thick from a mixture of 75 parts of flake glass and 25 parts of bleached kraft. The papers have increased dielectric strengths and reduced moisture vapor transmissions by virtue of the inclusion therein of glass flakelets. Thin laminates produced therefrom, using polyester, epoxy, or low-loss phenolic binders have good tensile impact and flexural strengths, low moisture absorption and transmission, and good surface hardness and flame and abrasion resistance. The papers or laminates produced therefrom are promising as surfacing sheets, e.g., exterior, electrical laminates, road sign laminates, pipe materials, and in various decorative applications.

Figure 3:
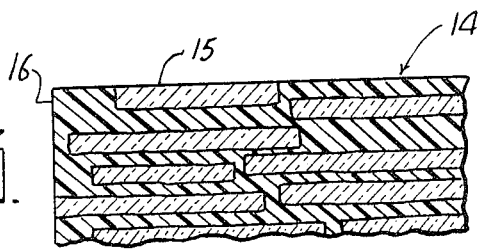
FIG. 3 is a view in vertical section similar to FIG. 2, but showing a different polarizing sheet structure.

A fragment of a polarizing sheet 14 is shown in FIG. 3. The sheet 14 is similar to the sheet 10 of FIGS. 1 and 2, except that the gas pockets 13 and omitted. Instead, the sheet 14 is composed of glass flakelets 15 embedded in a binder resin 16. Either the flakes or a coating applied to their surfaces has a refractive index differing from that of the binder resin 16 by at least 0.2.

The relative proportions between a binder and glass flakes in a polarizing panel according to the invention can be varied within broad limits. For example, such a panel has been produced using as little as 10 percent of flakes with 90 percent of the binder, and as much as 75 percent of flakes with 25 percent of the binder, and as much as 90 percent of flakes could be used with 10 percent of the binder, if desired. An essential feature of such a panel is the provision of a substance having a refractive index differing from that of the glass by at least 0.2, as discussed above.

The terms "percent" and "parts" as hereinbefore used, and as used in the appended claims, refer to percent and parts by weight, unless otherwise indicated.

It will be apparent that various changes and modifications can be made from the specific details discussed above without departing from the spirit of the attached claims.

What I claim is:

1. A method for producing a polarizing element comprising a binder composition and a plurality of glass flakelets dispersed therein, the polarizing element having randomly disposed interfacial disturbance regions uniformly distributed throughout the element in which the binder composition is separated from the surfaces of the flakelets, the interfacial disturbance regions defining pockets having a first major surface bounded by at least one flakelet and a second opposed major surface bounded by the binder composition, said method consisting essentially of the steps of mixing glass flakelets with a dispersion of a resinous material hardenable at elevated temperatures to a transparent mass and an excess of a volatile substance to produce a mixture which consists essentially of the glass flakelets, the resinous material and the volatile substance, three dimensionally confining the mixture under a pressure sufficient to prevent excessive volatilization and to prevent the formation of massive gas bubbles, and heating the mixture while under the confining pressure to harden the resinous material and to vaporize the volatile substance to a degree necessary to cause the interfacial disturbance regions between glass flakelets and the resinous material and to render the mixture polarizing.

2. A method as claimed in claim 1 wherein the volatile substance is a polymerizable monomeric material.

3. A method as claimed in claim 1 wherein the volatile substance is a solvent for the resinous material.

4. A method as claimed in claim 1 wherein the volatile substance is water.

5. A method for producing a polarizing element comprising a binder composition and a plurality of glass flakelets dispersed therein, the polarizing element having randomly disposed interfacial disturbance regions uniformly distributed throughout the element in which binder composition is separated from the surfaces of the flakelets, the interfacial disturbance regions defining pockets having a first major surface bounded by at least one flakelet and a second opposed major surface bounded by the binder composition, said method consisting essentially of the steps of mixing about 50 parts of glass flakelets with a binder composition which consists essentially of 100 parts of a polyester resin curable by addition polymerization to a hard, light-transmitting mass, 50 parts of styrene monomer and about 1 part of benzoyl peroxide, forming the resulting mixture into a desired shape, three dimensionally confining the mixture under a pressure sufficient to prevent excessive volatilization and to prevent the formation of massive gas bubbles, and applying heat to the mixture while under the confining pressure to convert the polyester to a hardened condition and to vaporize a portion of the styrene monomer to cause the interfacial disturbance regions between glass flakelets and the binder composition and to render the mixture polarizing.

References Cited by the Examiner

UNITED STATES PATENTS

| | | | |
|---|---|---|---|
| 2,763,897 | 9/1956 | Gates et al. | 264—55 |
| 2,769,205 | 11/1956 | Pfleumer | 264—55 |
| 2,981,980 | 5/1961 | Brown et al. | 264—2 |
| 3,024,701 | 3/1962 | Marks et al. | 264—2 |

ROBERT F. WHITE, *Primary Examiner.*

ALEXANDER H. BRODMERKEL, *Examiner.*

B. SNYDER, *Assistant Examiner.*